United States Patent Office 3,287,464
Patented Nov. 22, 1966

3,287,464
NEW THIADIAZOLINONE COMPOUNDS AND PROCESSES FOR THEIR PRODUCTION
Venkatachala L. Narayanan, Highland Park, and Jack Bernstein, New Brunswick, N.J., assignors to Olin Mathieson Chemical Corporation, New York, N.Y., a corporation of Virginia
No Drawing. Filed Aug. 12, 1965, Ser. No. 479,281
7 Claims. (Cl. 260—302)

This invention relates to new thiadiazolinones and to new intermediates useful in the preparation thereof. The new thiadiazolinones of this invention can be represented by the Formula I:

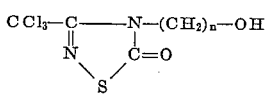

wherein $n$ is an integer from 2 through 10, preferably 2 or 3.

The thiadiazolinones are prepared by a two-step process of this invention utilizing as intermediates new compounds of the Formula II:

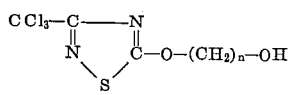

wherein $n$ is as hereinbefore defined.

The new intermediates of Formula II are prepared by interacting 3-trichloromethyl-5-chloro-1,2,4-thiadiazole with a compound of the formula

wherein $n$ is as hereinbefore defined; the reaction preferably being carried out in the presence of a strongly basic catalyst, such as sodium ethylate.

The intermediates of Formula II are then converted to the final products of Formula I by heating, preferably at a temperature of about 150° C. to about 170° C.

Both the new final products of this invention of the Formula I and the new intermediates of this invention of the Formula II are useful as soil fungicides, in that when mixed into the soil at a concentration of about 50 p.p.m. they protect seeds and plants against a broad spectrum of pathogenic fungi, like species of the fungal genera Pythium, Fusarium, Rhizoctonia and Sclerotium. Moreover, since they are less volatile than the corresponding nonhydroxylated derivatives, they retain their antifungal activity after being mixed with soil longer than the said derivatives.

The following examples illustrate the invention (all temperatures being in centigrade):

EXAMPLE 1

*3-trichloromethyl-5-(2-hydroxyethoxy)-1,2,4-thiadiazole*

(a) *Preparation of 3-trichloromethyl-5-chloro-1,2,4-thiadiazole.*—A solution of 65 g. (1.625 moles) of sodium hydroxide in 130 ml. of water is added dropwise with stirring during 2 hours to a mixture of 75 g. (0.378 mole) of trichloroacetamidine hydrochloride, 70 g. (0.376 mole) trichloromethanesulfenyl chloride and 500 ml. of methylene chloride. The temperature is kept between −4° and 1° by cooling in an ice-salt mixture. The methylene chloride layer is separated, washed twice with 50 ml. of water and dried with sodium sulfate. After evaporation of the solvent, the residue is vacuum distilled to obtain about 50 g. of 3-trichloromethyl-5-chloro-1,2,4-thiadiazole.

(b) *Preparation of 3-trichloromethyl-5-(2-hydroxyethoxy)-1,2,4-thiadiazole.*—Sodium methylate, 2.83 g., is dissolved in 30 ml. of absolute methanol and to this solution, 31 g. of ethylene glycol, dissolved in 20 ml. of absolute methanol, is added. The mixture is concentrated till the methanol is completely removed, and the solution is then added dropwise at room temperature to a solution of 3-trichloromethyl-5-chloro-1,2,4-thiadiazole in 100 ml. of ether. The reaction mixture is stirred overnight, washed with water, and then dried over MgSO$_4$. Removal of ether gives about 12.1 g. (92.4%) of the product as a thick pale yellow viscous oil. The infrared spectrum shows no C=O band 5.85$\mu$ indicating that the product is completely o-alkylated and no rearrangement has taken place at this stage.

*Analysis.*—Calc'd for $C_5H_5Cl_3N_2O_2S$: C, 22.51; H, 1.88; N, 10.84. Found: C, 21.87; H, 2.09; N, 10.99.

Similarly, by following the procedure of Example 1, step (b), but substituting other glycols for the ethylene glycol, the corresponding 5-substituted products are obtained. Thus, trimethylene glycol yields 3-trichloromethyl-5-(3-hydroxypropoxy)-1,2,4-thiadiazole, and tetramethylene glycol yields 3-trichloromethyl-5-(4-hydroxybutoxy)-1,2,4-thiadiazole.

EXAMPLE 2

*4-(2-hydroxyethyl)3-(trichloromethyl)-Δ$^2$-1,2,4-thiadiazolin-5-one*

Ten grams of 3-trichloromethyl-5-(2-hydroxyethoxy)-1,2,4-thiadiazole is distilled in vacuo under nitrogen, and the fraction that distills at 153–158°/0.6–0.7 mm. is collected as a thick yellow liquid, weighing about 5.6 g. I.R. shows strong C=O absorption at 5.85$\mu$ indicating rearrangement.

*Analysis.*—Calc'd for $C_5H_5Cl_3N_2O_2S$: C, 22.51; H, 1.88; N, 10.84; Cl, 40.48. Found: C, 22.79; H, 1.92; N, 10.63; Cl, 40.37.

Similarly, by following the procedure of Example 2, but substituting other compounds of Formula II for the 3-trichloromethyl - 5 - (2 - hydroxyethoxy) - 1,2,4 - thiadiazole, the corresponding 4-substituted derivatives are obtained. Thus, 3-trichloromethyl - 5 - (3 - hydroxypropoxy) - 1,2,4 - thiadiazole yields 4-(3-hydroxypropyl)-3-(trichloromethyl)-Δ$^2$-1,2,4-thiadiazole - 5 - one, and 3-trichloromethyl - 5 - (4 - hydroxybutoxy) - 1,2,4 - thiadiazole yields 4-(4-hydroxybutyl)-3-trichloromethyl-Δ$^2$-1,2,4-thiadiazolin-5-one.

The invention may be variously otherwise embodied within the scope of the appended claims.

What is claimed is:
1. A compound of the formula

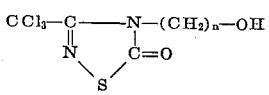

wherein $n$ is an integer from 2 through 10.
2. 3 - trichloromethyl - 4 - (2 - hydroxyethyl) - Δ$^2$-1,2,4-thiadiazolin-5-one.

3. A compound of the formula

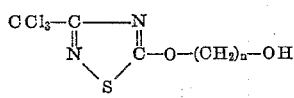

wherein $n$ is an integer from 2 through 10.

4. 3 - trichloromethyl - 5 - (2 - hydroxyethoxy) - 1,2,4-thiadiazole.

5. A process for preparing a compound of claim 1 which comprises heating a compound of claim 3.

6. The process of claim 5 wherein the heating is done at a temperature of about 150° C. to about 170° C.

7. A process for preparing a compound of claim 3, which comprises interacting 3-trichloromethyl-5-chloro-1,2,4-thiadiazole with a compound of the formula $$HO-(CH_2)_n-OH$$

wherein $n$ is an integer from 2 through 10.

No references cited.

ALEX MAZEL, *Primary Examiner.*

ALTON D. ROLLINS, *Assistant Examiner.*